P. PLANT.
Lamp Burner.
No. 2,973. Reissued June 9, 1868.
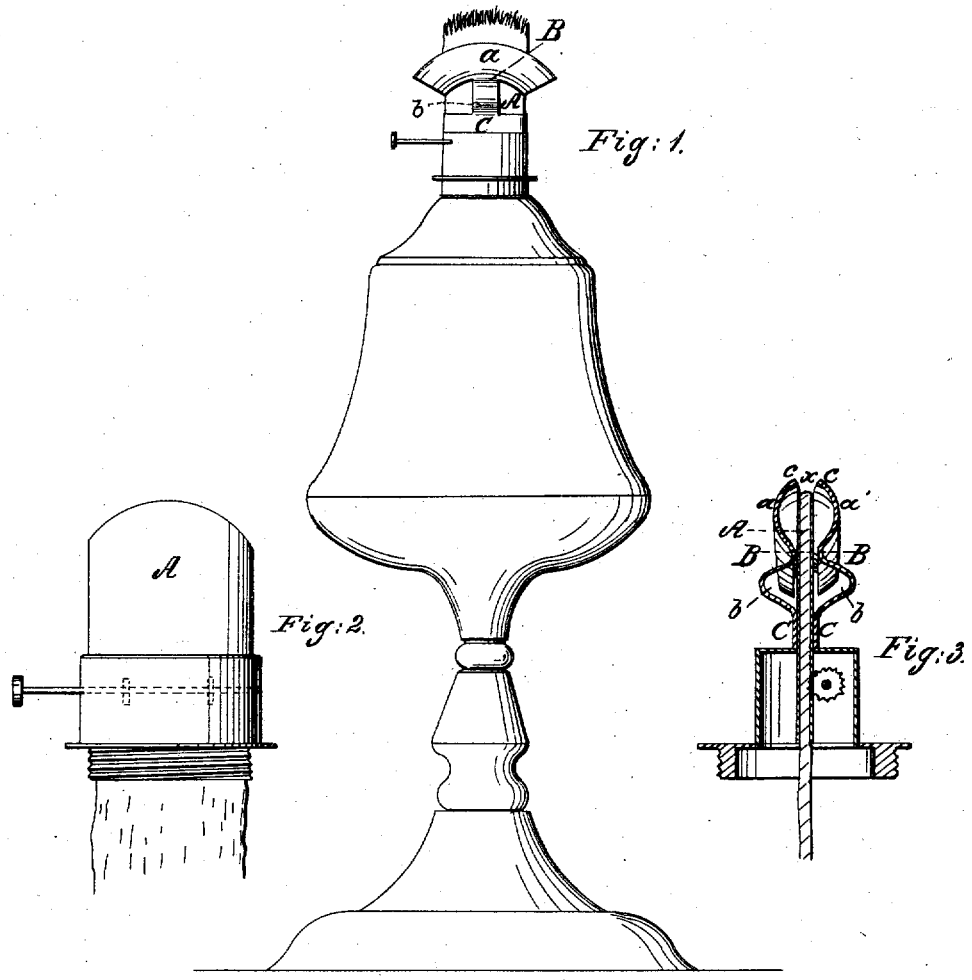
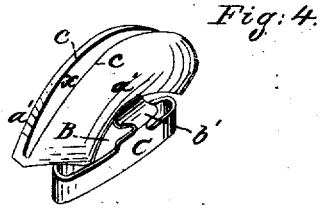
Witnesses:
C. Jacobs.
John P. Jacobs
Inventor:
P. Plant
by A R Ely
N. PETERS, Photo-Lithographer, Washington, D. C.

United States Patent Office.

P. HANNAY, OF WASHINGTON, DISTRICT OF COLUMBIA, AND HUDSON TAYLOR, OF POUGHKEEPSIE, NEW YORK, ASSIGNEES, BY MESNE ASSIGNMENTS, OF PASCAL PLANT, OF WASHINGTON, DISTRICT OF COLUMBIA, ASSIGNORS TO HUDSON TAYLOR, TRUSTEE.

*Letters Patent No.* 19,896, *dated April* 6, 1858; *reissue No.* 2,973, *dated June* 9, 1868.

DIVISION A.

IMPROVEMENT IN LAMPS.

The Schedule referred to in these Letters Patent and making part of the same.

Be it known that I, PASCAL PLANT, of Washington, in the District of Columbia, have invented a new and useful Improvement in Lamps, of which the following is a full description, with the accompanying drawings.

Figure 1 is a perspective view of the lamp with improvement.

Figure 2 is a side elevation of wick-tube, cap-piece removed.

Figure 3 is a transverse section, vertical, through wick-tube and cap-piece.

Figure 4 is a perspective view of cap-piece secured to the slide by arms.

My invention relates principally to that class of lamps fed by volatile or other oils, having a high equivalent of carbon. Heretofore great difficulty has been experienced in bringing those kind of oils into general and successful use for illuminating purposes, because of their containing an excess of carbon, which, as it requires a much larger amount of oxygen for its combustion than can be supplied from the air immediately surrounding the flame, allows a great portion of the gas engendered to escape in an unconsumed condition, in the shape of smoke or soot, a perfect combustion not having been attained. To remedy this it has been found necessary to provide the lamps with a chimney for creating an artificial draught, or, in other words, of bringing a larger amount of air in contact with the flame for the consumption of the free carbon, and the purposes of a more perfect combustion, but such an arrangement as this renders the lamps costly, liable to breakage, and unfit to be carried about.

The nature of my invention consists in forcing through the lower part of the flame a current of fresh air, so that the oxygen therein contained shall be brought immediately in contact with the carbon the moment the degree of temperature of the latter is sufficiently high to promote combustion, to effect which I provide the lamp with a cap-piece of such construction and arrangement that the entire carbon may be essentially consumed as it is evolved, without the aid of a chimney.

In the accompanying drawings, the upper part of the wick-tube A is represented as enclosed by a cap-piece, B, consisting of two sides, *a a*, properly formed and shaped in reference to the wick-tube A, and so arranged as to form an arched dome, as it were, over the wick-tube, having a slot at the top, and open at the bottom, in which position they are held by means of arms *b*, riveted or otherwise secured to or formed on a slide, C, which fits over the wick-tube, and which can be moved up or down, to elevate or depress the cap-piece. The lips *c*, or upper ends of the sides *a a*, are curved or inclined towards each other, but not meeting, thus forming a slot, *x*, as it were, corresponding essentially to the upper end of the wick-tube, bounding lines or lips *c* of the slot *x*, being so arranged that, when the cap-piece is adjusted, they shall be essentially in a line parallel with the sides of the wick-tube, so that, when the lamp is lighted, the under or blue part of the flame shall burn in the slot *x*, and spread, nearly to the edge of the lips *c*, thus forcing or causing the body of the air to pass through the flame, instead of impinging on its sides, for, as the air confined in the under side of the cap-piece B (which, for this purpose, is curved or set at an angle to the top of the wick-tube A, so as to form an air-chamber, and to deflect the air to the flame) is heated and rises, there being only a small space at the top through which it can pass, and that essentially through the flame, a sufficient current will be induced to supply the requisite amount of oxygen for the complete combustion of the carbon. The form and size of the slot *x* of the cap-piece B, and its elevation over the wick-tube A, will depend mainly upon the size and form of the upper end of the wick-tube, to which it can be readily adapted, its height being adjusted on the tube, or, if stationary, the wick being regulated to conform to its position. When the lips are detached from each other, they may be corrugated, and may be made to approach to or recede from each other by an adjusting-screw, or by compressing or opening the arms in any suitable manner.

The sides *a a*, or the cap-piece, instead of being secured to the slide by arms *b*, may be hinged, as at *d*, and thus be thrown back from the flame, for the purpose of reaching and trimming the wick with facility, without removing it from the lamp; and here it may be remarked that a glass chimney or globe may be used, if deemed desirable.

From the foregoing description, it will be readily perceived that the form of my cap-piece, and the manner of attaching or securing it to the lamp, may be modified, so long as it is so constructed and arranged, in relation to the wick and wick-tube, that the body of the current of air shall pass through the flame, and the flame burn in and essentially fill the space of the slot.

What I claim is—

1. Causing a current of air to impinge upon or commingle with the lower or blue part of the flame of a hydrocarbon-lamp, through the instrumentality of a cap-piece or burner, without the aid of a chimney, substantially as described.

2. A cap-piece or burner, combined with and applied to a hydrocarbon-lamp, for the purpose of producing combustion, without the aid of a chimney, substantially as described.

3. Making the cap-piece or burner adjustable relatively to the wick and wick-tube, substantially as described.

4. The combination of a flat-wick tube with a cap-piece or burner and arms or frame, whereby the burner is held on the wick-tube, substantially as described.

5. The combination of the burner (with devices for attaching and supporting the same) with the wick-tube, substantially as described.

Witness my hand to the above specification.

PASCAL PLANT.

Witnesses:

A. B. Ely,

V. Hornbach.